No. 870,893. PATENTED NOV. 12, 1907.
R. LUNDELL.
ALTERNATING CURRENT MOTOR.
APPLICATION FILED NOV. 27, 1905.

2 SHEETS—SHEET 1.

Witnesses
Inventor
Robert Lundell
By his Attorney
Charles J. Kintner

No. 870,893. PATENTED NOV. 12, 1907.
R. LUNDELL.
ALTERNATING CURRENT MOTOR.
APPLICATION FILED NOV. 27, 1905.

2 SHEETS—SHEET 2.

Witnesses
M. F. Keating
H. J. Schutte

Inventor
Robert Lundell
By his Attorney
Charles J. Kintner

UNITED STATES PATENT OFFICE.

ROBERT LUNDELL, OF NEW YORK, N. Y.

ALTERNATING-CURRENT MOTOR.

No. 870,893.  Specification of Letters Patent.  Patented Nov. 12, 1907.

Application filed November 27, 1905. Serial No. 289,178.

*To all whom it may concern:*

Be it known that I, ROBERT LUNDELL, a citizen of the United States, residing in New York, borough of Manhattan, county and State of New York, have made a new and useful Invention in Alternating-Current Motors, of which the following is a specification.

The present invention relates to that class of alternating current motors which are furnished with a commutator and which may be operated from a single phase or two-wire circuit.

It relates particularly to a type of motor described by me in a prior United States patent No 782,863, granted February 21st, 1905. In this type of motor the armature or rotor is caused to rotate in its field magnet or stator by the torque effects of short circuited currents in certain groups of armature coils, combined with the torque effects of other currents from an outside source of alternating current supply, which are caused to flow through the remaining groups of armature coils. In the above-mentioned patent I have also shown means for reversing the direction of rotation by shifting the brushes from one position to another.

The objects of the present invention are—First, to provide more convenient means than those described in the above-mentioned patent for reversing the direction of rotation. Second, to increase the efficiency of the apparatus by combining a symmetrically distributed stator winding with a controller connected to various points of the stator winding for the purpose of overcoming the self-induction of the rotor winding at the highest speeds of the rotor.

Figure 1:
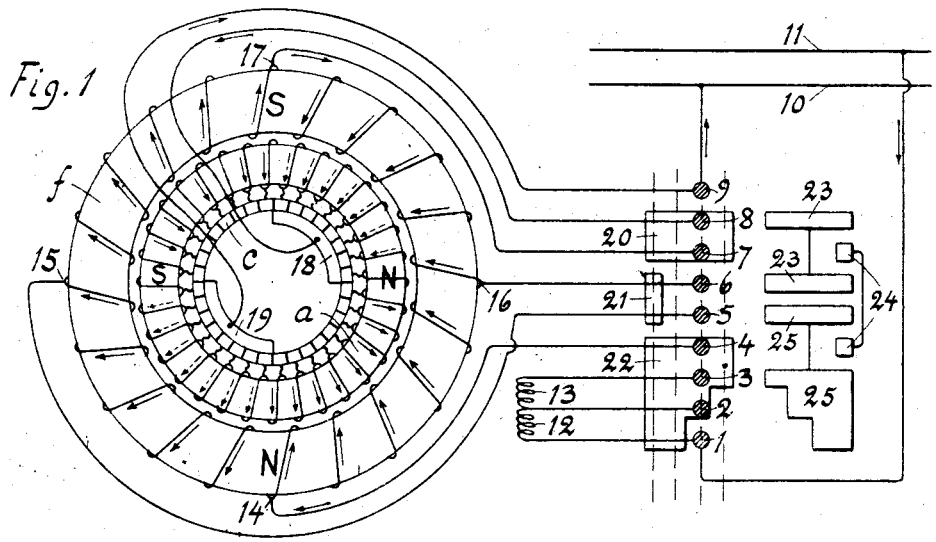
Figure 2:
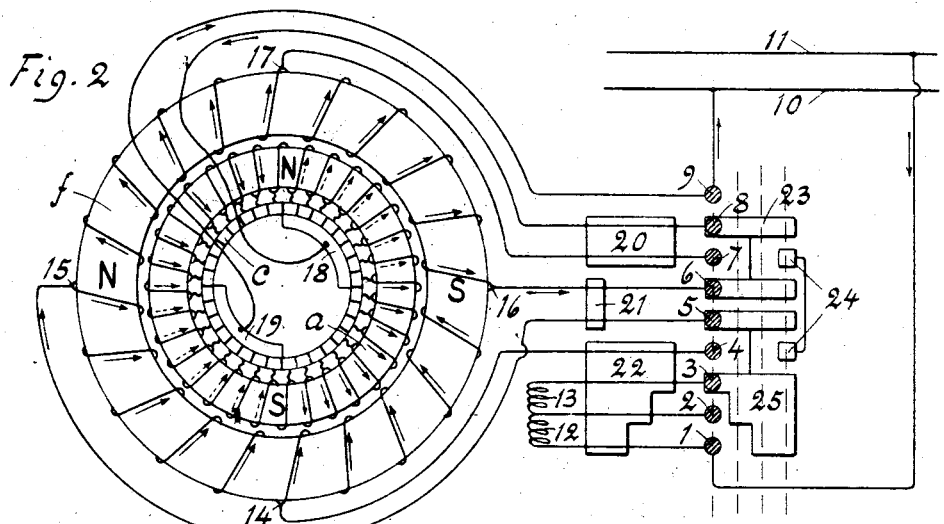
Figure 3:
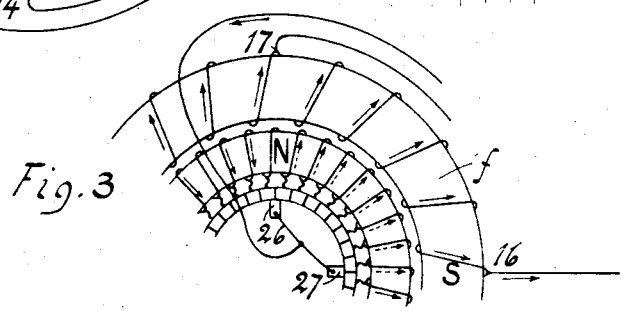
Figure 4:
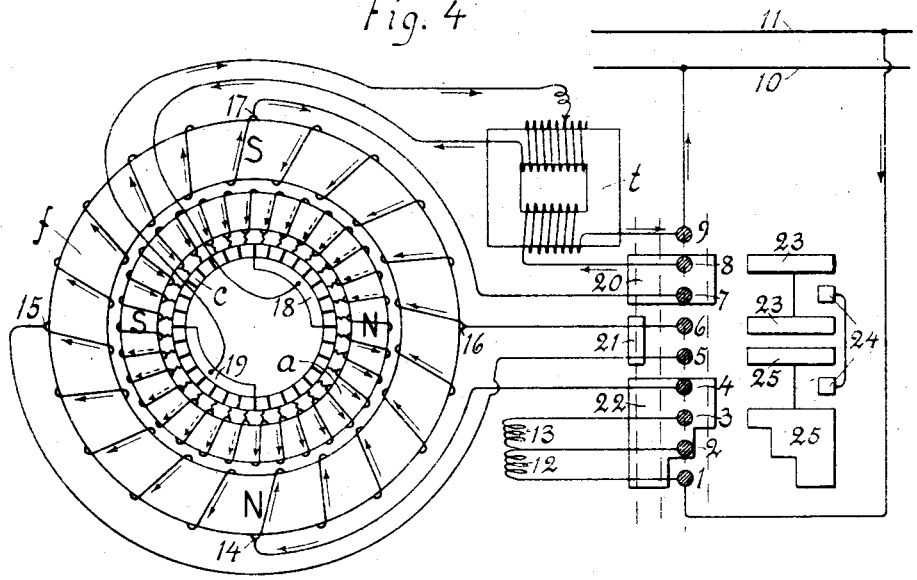

Referring now to the drawings, Figure 1 represents diagrammatically an alternating current motor of the type referred to, said motor being connected to a pair of current mains through a speed regulating and pole changing switch or controller shown to the right of the figure. Fig. 2 represents the same apparatus, the chief difference being that the direction of rotation has been reversed. Fig. 3 shows a portion of Fig. 2 and illustrates a different arrangement of short-circuiting the armature coils. Fig. 4 illustrates a modification of the manner in which the outside currents may be introduced into the rotor.

Referring now to Fig. 1 in detail, *a* represents the armature or the rotor, *c* the commutator, and *f* the field magnet or the stator. Both the rotor and the stator are for convenience of illustration supplied with "Gramme ring" windings and it should be understood that in a working machine the well known drum windings would be preferable. 1 to 9 inclusive represent the stationary contacts of a controller and 20 to 25 inclusive represent the movable contacts of the said controller. 10 and 11 represent the alternating current supply wires. 12 and 13 represent suitable starting and speed regulating resistances which may be inductive or non-inductive as the case may be. 14, 15, 16 and 17 represent terminals or leads of the stator winding, said terminals being respectively connected with the stationary controller contacts 4, 5, 6 and 7 as shown. 18 and 19 represent wide contact blocks or brushes, each arranged to cover about 90 electrical degrees on the commutator. These wide brushes may for mechanical or electrical reasons be subdivided into numerous brushes, the chief point being that the short circuit should be continuous through an arc of about 90 electrical degrees.

The operation of this motor will best be understood by following the currents as they flow through the various circuits of the apparatus at one particular moment. The arrows shown in full lines will indicate the direction of the primary currents and the dotted arrows will indicate the direction of the induced or the short-circuited currents. Starting then at the supply wire 11, the current flows to the stationary contact 1 of the controller, through the regulating resistance 12 to contact 4 and to the stator terminal 14. At this point the current divides itself in the stator winding or the circuit 14 to 17, causing polarities N, S, as clearly shown on the drawing. From the stator terminal 17 the current flows to other stationary controller contacts 7 and 8, then to brush 18 at which it again divides itself in the two-circuit rotor winding, as clearly shown by the arrows drawn in full. From the other brush 19 the current finally flows to stationary contact 9 and to the other supply wire 10. In the portions of the rotor winding which are short-circuited by the wide brushes, it will be found that the induced or the short-circuited currents will flow as indicated by the dotted arrows. The combined polarities from the primary and the induced currents will consequently be located about as indicated by letters N, S, on the rotor and the direction of rotation will be opposite to that of the hands of a clock. At the next moment when the currents are reversed the polarities will also be reversed and the direction of rotation remains as before.

Attention is now called to the movable controller contacts 20, 21 and 22, also to the four terminals 14, 15, 16 and 17 of the stator winding. Four positions of the left hand movable contacts of the controller are indicated in Fig. 1 by the fine broken lines drawn across the contacts. The first position puts both of the resistances 12 and 13 in series with the motor. The second position (the one shown in Fig. 1) cuts out the resistance 13 and the third position cuts out both of the resistances. The fourth and last position causes the terminals 15 and 16 of the stator winding to become connected by the movable contact 21 engaging with the stationary controller contacts 5 and 6. In other words, two equi-potential points 15 and 16 in the stator winding 14 to 17 have now become connected or short-circuited. These points are at 90 electrical degrees from the terminals 14 and 17. The effect of this short-circuit is that the rotor flux, which is 90 electrical degrees from the stator flux and which increases the self-induction of the rotor winding, has practically become nullified by the opposing secondary currents in the circuit 15 to 16 of the stator winding. The last position of the controller has thus caused the voltage of the A. C. supply circuit to become more effective by reducing the self-induction of the motor to a minimum.

Referring now to Fig. 2 it will be noticed that the wide brushes 18 and 19 are in the same position as in Fig. 1 and that the connections between the motor and the stationary controller contacts are identical with those shown in Fig. 1. The polarities of the stator and the rotor have, however, each been shifted by 90 electrical degrees in opposite directions resulting in a reversal of the direction of rotation. This has been accomplished by a change in the connections on the controller, due to the right hand movable contacts being made to engage with the stationary controller contacts. Following the current flow at one particular moment same as in Fig. 1, we find that the current now enters the stator winding at terminal 15 and that it leaves the stator winding at 16. In other words, the field circuit has been shifted by 90 electrical degrees, that is, from the circuit 14 to 17 Fig. 1 to the circuit 15 to 16 in Fig. 2. Following the current flow into the rotor we find that the current enters by brush 18 or same as before. This gives to the primary currents in the rotor the same direction as before. The induced or the short-circuited currents in the rotor have, however, become reversed, owing to the shifting of the polarities N, S in the stator. These polarities have been shifted by 90 electrical degrees in a right hand direction, whereas the polarities of the rotor have been shifted by the same angle in a left hand direction, as clearly shown on the drawing. It is evident that the motor now turns in the same direction as the hands of a clock. The four positions of the right hand movable contacts of the controller cause the motor to operate precisely as described in connection with the left hand contacts, the only difference being that the rotor revolves in the opposite direction. The last position causes the stator terminals 14 and 17 to become connected together instead of the terminals 15 and 16 in Fig. 1, the result under the new conditions being the same as described above.

Attention is now called to Fig. 3 of the drawings. This figure (as far as shown) is similar to Fig. 2, the only difference being that a pair of brushes 26 and 27, instead of the wide brush 18, are employed to short-circuit the corresponding part of the rotor. The rotor may be short-circuited in this manner, though the commutation will not be as perfect as when the wide brush is employed. It will be seen that the current reverses direction in the rotor coils immediately under the brush 26, very much the same as in a direct current motor. Additional difficulties in regard to sparking will, however, be met with on account of the distributed stator winding, which makes a small air-gap under the commutated coil a matter of necessity. It will consequently be understood that there will be sparking at the leaving edge of brush 26 unless the inductive voltage of the individual rotor coils is exceptionally low. Running in the other direction sparking would occur at the leaving edge of brush 27. Looking back at the wide brush 18 in Fig. 2, we find that this brush has no leaving edge except at a point where there is no reversal of current in the rotor coils. If the stator and the rotor windings are so proportioned with relation to one another, that the primary and the short-circuited currents in the rotor coils are about alike in amperes, it follows that there can be no sparking when the wide brushes shown in Figs. 1 and 2 are used. It is also possible to obtain excellent results as regards non-sparking by introducing into the rotor winding between the wide brushes a secondary current from a transformer. As there is no reversal of polarities of the brushes for a reversal of direction of rotation this modification becomes quite simple. Such an arrangement is clearly illustrated in Fig. 4, which figure is similar to Fig. 1, the only difference being the addition of the transformer $t$.

It should be pointed out that the stator winding should be of sufficient cross-section to take care of the extra duty at the fourth positions of the controller, that is, it should be heavy enough to take care of the secondary currents which will flow at 90 electrical degrees to the primary currents of excitation. The core section of the stator should also be considerably greater than that of the rotor in order to keep the core losses within proper limits. It will be understood that as the rotor approaches synchronous speed the core losses in the rotor will be reduced to a minimum.

Having thus described my invention what I claim and desire to secure by Letters Patent of the United States is—

1. An alternating current motor comprising a stator having an energizing winding, a rotor having coils connected to a commutator, brushes upon the commutator for short-circuiting certain groups of rotor coils at an angle of about forty-five electrical degrees to the stator-field and for introducing outside currents into the other rotor coils not short-circuited; in combination with means for shifting the polarities of the stator, for the purpose of reversing the direction of rotation, substantially as described.

2. An alternating current motor comprising a stator connected to a source of alternating current supply, a rotor having coils connected to a commutator; in combination with means for short-circuiting certain groups of rotor coils located at an angle of about forty-five electrical degrees to the stator-field, and additional means for shifting the polarities of the stator in order to reverse the rotor, substantially as described.

3. An alternating current motor comprising a stator having a distributed energizing winding, a rotor having coils connected to a commutator, wide brushes extending about 90 electrical degrees for short-circuiting certain groups of rotor coils at an angle of about forty-five electrical degrees to the stator-field and for introducing outside currents into the other rotor coils not short-circuited; in combination with a controller having circuit connections leading to points or terminals in the distributed stator winding located at about 90 electrical degrees from each other and means for shifting the polarities of the stator, substantially as described 4 An alternating current motor comprising a stator having an energizing winding, a rotor having coils connected to a commutator, stationary brushes upon the commutator for short-circuiting certain groups of rotor coils at an angle of about forty-five electrical degrees to the stator-field and for introducing outside currents into the other rotor coils not short-circuited; in combination with means on the stator for nullifying the rotor-flux and the self-induction of the rotor, and additional means for shifting the relative positions of the rotor- and the stator-polarities, for the purpose of reversing the direction of rotation, substantially as described.

5. An alternating current motor comprising the combination of a stator having an energizing winding, a rotor having coils connected to a commutator, brushes upon the commutator for short-circuiting certain groups of rotor coils and for introducing outside currents into the other rotor coils not short-circuited, means for shifting the polarities of the stator and additional means for overcoming the self-induction of the rotor, substantially as described.

6. An alternating current motor comprising the combination of a stator having a distributed energizing winding, a rotor having coils connected to a commutator, brushes upon the commutator for short-circuiting certain of the currents utilized to propel the rotor and for introducing into the rotor other propelling currents from an outside source of supply, and means for short-circuiting equipotential points in the stator winding, for the purpose of nullifying the rotor-flux and the self-induction of the rotor, substantially as described.

7. An alternating current motor comprising the combination of a stator having a distributed energizing winding, a rotor having coils connected to a commutator, brushes upon the commutator for short-circuiting certain groups of rotor coils and for introducing outside currents into the other rotor coils not short-circuited, a starting switch or controller having circuit connections to the motor and to a source of alternating current supply, and means on the controller for connecting together two equipotential points in the stator winding, substantially as described.

8. An alternating current motor having a rotor which is propelled by the combined effects of short-circuited induced currents and currents from an outside source of supply and a stator having a distributed winding with two sets of terminals located 90 electrical degrees apart; in combination with means for introducing outside currents into the stator winding through one set of said terminals and additional means for short-circuiting the other set of terminals at will, substantially as described.

9. An alternating current commutator motor provided with wide brushes extending approximately 90 electrical degrees and arranged to short-circuit certain of the currents utilized to propel the rotor and also to introduce into the rotor other propelling currents from an outside source of supply; in combination with a stator winding provided with means for shifting the polarities of the stator and additional means for overcoming the self-induction of the rotor, substantially as described.

In testimony whereof I have signed my name to this specification in the presence of two subscribing witnesses.

ROBERT LUNDELL.

Witnesses:
C. J. KINTNER,
M. F. KEATING.